US009419470B2

(12) United States Patent
Von Novak, III et al.

(10) Patent No.: US 9,419,470 B2
(45) Date of Patent: Aug. 16, 2016

(54) LOW POWER DETECTION OF WIRELESS POWER DEVICES

(71) Applicant: QUALCOMM Incorporated, San Diego, CA (US)

(72) Inventors: William Henry Von Novak, III, San Diego, CA (US); Francesco Carobolante, San Diego, CA (US); Weston Daniel Braun, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 14/273,234

(22) Filed: May 8, 2014

(65) Prior Publication Data

US 2015/0084586 A1    Mar. 26, 2015

Related U.S. Application Data

(60) Provisional application No. 61/881,322, filed on Sep. 23, 2013.

(51) Int. Cl.
*H02J 7/00* (2006.01)
*H01F 27/42* (2006.01)
*H02J 7/02* (2016.01)
*H02J 17/00* (2006.01)

(52) U.S. Cl.
CPC *H02J 7/025* (2013.01); *H02J 17/00* (2013.01)

(58) Field of Classification Search
CPC ............................... H04B 5/0037; H02J 7/025
USPC .......................................... 320/108; 307/104
See application file for complete search history.

(56) References Cited

U.S. PATENT DOCUMENTS

| 7,686,408 | B2 * | 3/2010 | Tamura | B41J 2/04541 |
| | | | | 347/68 |
| 7,793,121 | B2 * | 9/2010 | Lawther | H02J 7/025 |
| | | | | 136/243 |
| 9,094,055 | B2 * | 7/2015 | Low | H04B 5/0037 |
| 9,154,189 | B2 * | 10/2015 | Von Novak | H02J 5/005 |

(Continued)

FOREIGN PATENT DOCUMENTS

KR    20110065969 A    6/2011
WO    WO-2012004092 A2    1/2012

OTHER PUBLICATIONS

International Search Report and Written Opinion—PCT/US2014/051902—ISA/EPO—Mar. 9, 2015.

(Continued)

*Primary Examiner* — M'Baye Diao
(74) *Attorney, Agent, or Firm* — Knobbe Martens Olson & Bear LLP

(57) ABSTRACT

Exemplary embodiments are directed to detection and validation of wirelessly chargeable devices positioned within a charging region of a wireless power transmitter. A device may include a detection circuit comprising an oscillator, the detection circuit configured to detect a change in a frequency of the oscillator. The device may also include a wireless power transmitter configured to determine whether a chargeable device is positioned within a charging region of the transmitter upon the detection circuit detecting the change in the frequency of the oscillator, wherein the transmitter further configured to be selectively electrically isolated from the detection circuit.

27 Claims, 13 Drawing Sheets

(56) References Cited

U.S. PATENT DOCUMENTS

| | | | |
|---|---|---|---|
| 2008/0211458 A1* | 9/2008 | Lawther | H02J 7/025 320/132 |
| 2009/0284245 A1* | 11/2009 | Kirby | G06K 7/0008 323/318 |
| 2010/0315038 A1 | 12/2010 | Terao et al. | |
| 2010/0328044 A1* | 12/2010 | Waffenschmidt | H02J 7/025 340/10.4 |
| 2011/0254379 A1 | 10/2011 | Madawala | |
| 2012/0117730 A1 | 5/2012 | Lemire et al. | |
| 2012/0329405 A1 | 12/2012 | Lee et al. | |
| 2013/0154383 A1 | 6/2013 | Kasturi et al. | |
| 2013/0157383 A1 | 6/2013 | Cho | |
| 2014/0184150 A1* | 7/2014 | Walley | H02J 5/005 320/108 |

OTHER PUBLICATIONS

Partial International Search Report—PCT/US2014/051902—ISA/EPO—Jan. 5, 2015.

* cited by examiner

LOW POWER DETECTION OF WIRELESS POWER DEVICES

CROSS REFERENCE TO RELATED APPLICATIONS

This application claims priority under 35 U.S.C. §119(e) to U.S. Provisional Patent Application No. 61/881,322 entitled "LOW POWER DETECTION OF WIRELESS POWER DEVICES" filed on Sep. 23, 2013 the disclosure of which is hereby incorporated by reference in its entirety.

FIELD

The present invention relates generally to wireless power, and more specifically, to a wireless power transmitter for detecting valid chargeable devices positioned within an associated charging region.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power. As such, these devices constantly require recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

In wireless power applications, it may be desirable to conserve energy when devices are not being charged. A need exist for methods, systems, and devices for detecting chargeable devices while conserving energy in wireless power transmitters.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides a device for providing wireless power. The device comprises a detection circuit comprising an oscillator, the detection circuit configured to detect a change in a frequency of the oscillator. The device further comprises a wireless power transmitter configured to determine whether a chargeable device is positioned within a charging region of the wireless power transmitter upon the detection circuit detecting the change in the frequency of the oscillator.

Another aspect of the subject matter described in the disclosure provides a device for providing wireless power. The device comprises a detection circuit configured to detect a change in a phase of a signal measured by of the detection circuit. The device further comprises a wireless power transmitter configured to determine whether a chargeable device is positioned within a charging region of the wireless power transmitter upon the detection circuit detecting the change in the phase of the signal.

Another aspect of the subject matter described in the disclosure provides a device for providing wireless power. The device comprises a detection circuit comprising a differential antenna, the detection circuit configured to detect a change in a voltage or current at a center tap point of the differential antenna. The device further comprises a wireless power transmitter configured to determine whether a chargeable device is positioned within a charging region of the wireless power transmitter upon the detection circuit detecting the change in the voltage or current at the center tap point.

Another aspect of the subject matter described in the disclosure provides a method for providing wireless power. The method comprises detecting a change in a frequency of an oscillator of a detection circuit. The method further comprises determining whether a chargeable device is positioned within a charging region of a wireless power transmitter upon detecting the change in the frequency of the oscillator.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The term "wireless power" is used herein to mean any form of energy associated with electric fields, magnetic fields, electromagnetic fields, or otherwise that is transmitted between a transmitter to a receiver without the use of physical electrical conductors. Hereafter, all three of this will be referred to generically as radiated fields, with the understanding that pure magnetic or pure electric fields do not radiate power. These must be coupled to a "receiving antenna" to achieve power transfer.

Figure 1:
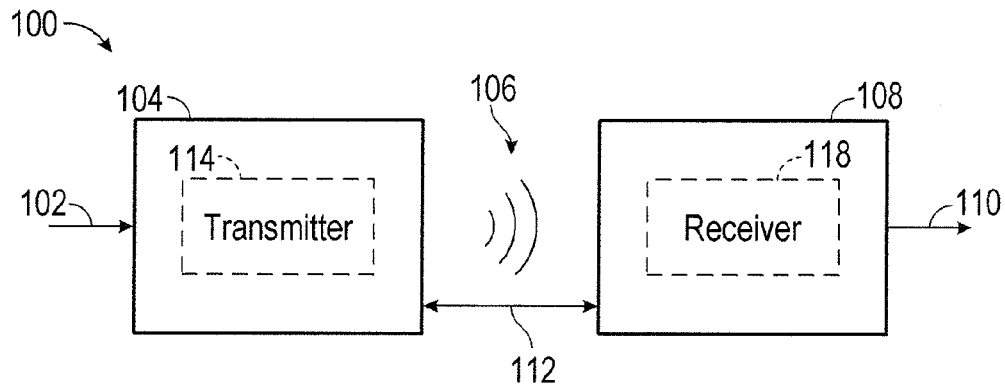
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a field 106 for providing energy transfer. A receiver 108 couples to the field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
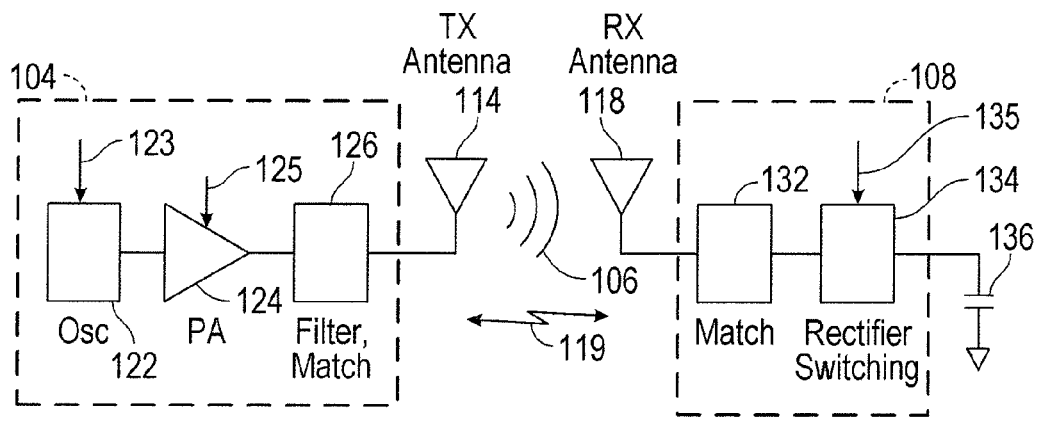
FIG. 2 shows a simplified schematic diagram of a wireless power transfer system.

FIG. 2 shows a simplified schematic diagram of a wireless power transfer system.

The transmitter 104 includes an oscillator 122, a power amplifier 124 and a filter and matching circuit 126. The oscillator is configured to generate at a desired frequency, such as 468.75 KHz, 6.78 MHz or 13.56, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
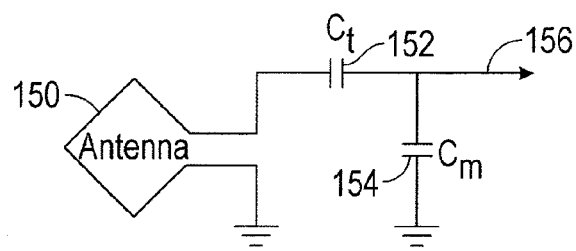
FIG. 3 illustrates a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Figure 4:
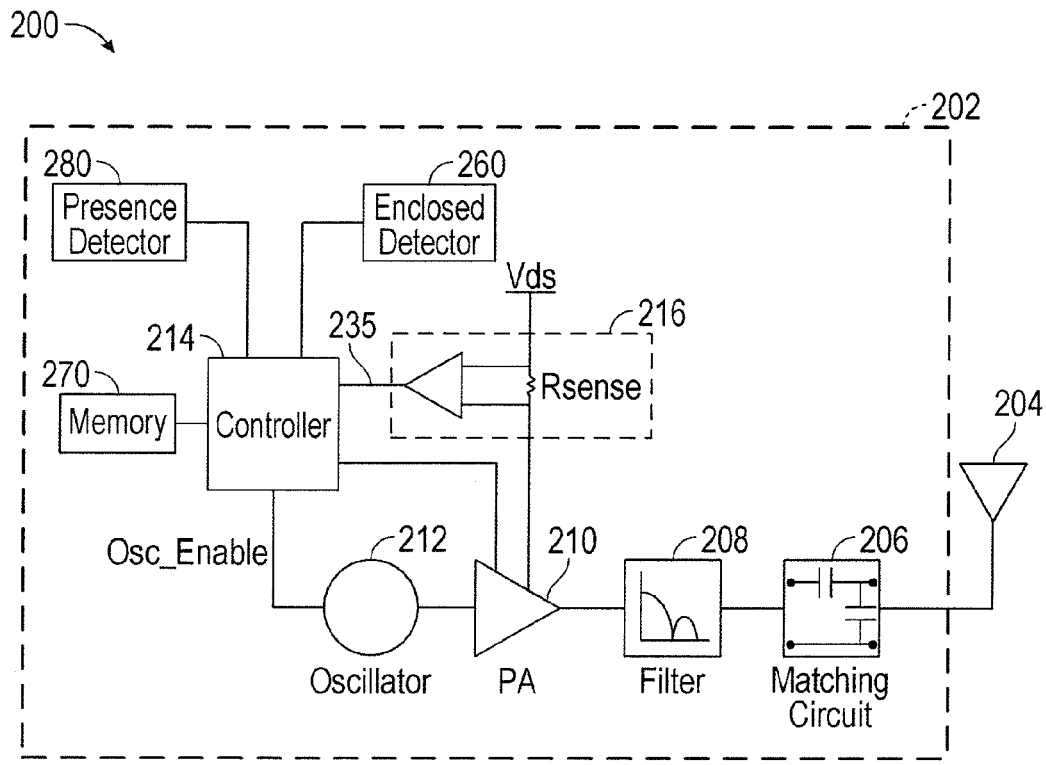
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. It is noted that transmitter 200 may operate at any suitable frequency. By way of example, transmitter 200 may operate at the 6.78 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current drawn by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency or phase of the oscillator, and for adjusting the output power level for implementing a communication protocol for interacting with neighboring devices through their attached receivers. It is noted that the controller 214 may also be referred to herein as processor 214. As is well known in the art, adjustment of oscillator phase and related circuitry in the transmission path allows for reduction of out of band emissions, especially when transitioning from one frequency to another.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy and to communicate with an active receiver.

Transmit antenna 204 may be implemented with a Litz wire or as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
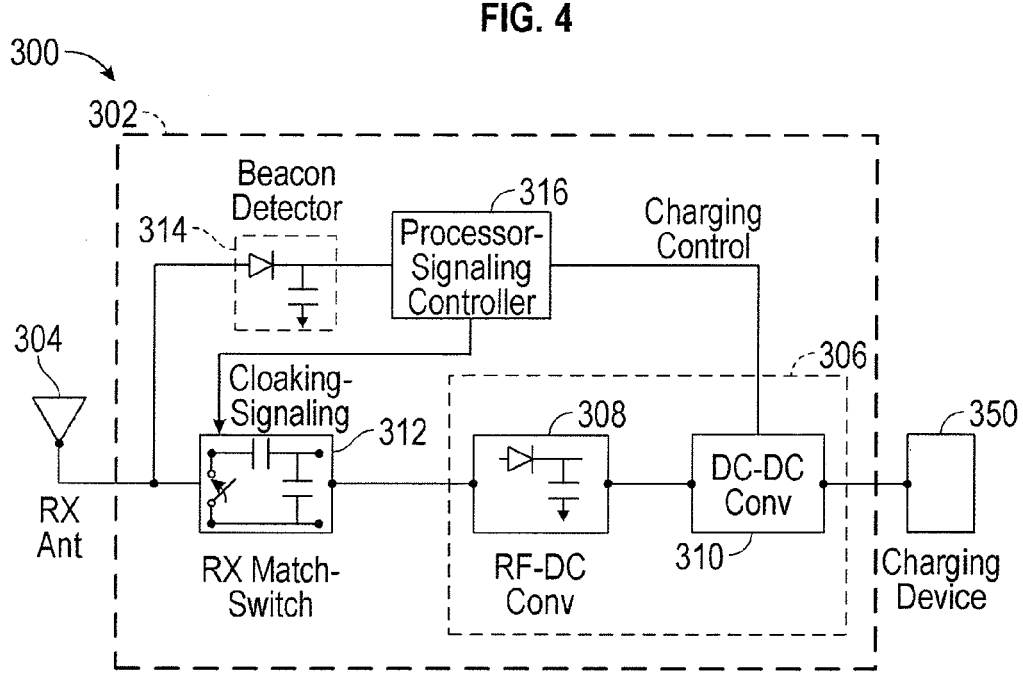
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or within a specified range of frequencies, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304.

Receive circuitry 302 includes power conversion circuitry 306 for converting a received RF energy source into charging power for use by device 350. Power conversion circuitry 306 includes an RF-to-DC converter 308 and may also include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking." Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 µsec.

In an exemplary embodiment, communication between the transmitter and the receiver refers to a device sensing and charging control mechanism, rather than conventional two-way communication. In other words, the transmitter may use on/off keying of the transmitted signal to adjust whether energy is available in the near-field. The receivers interpret these changes in energy as a message from the transmitter. From the receiver side, the receiver may use tuning and de-tuning of the receive antenna to adjust how much power is being accepted from the near-field. The transmitter can detect this difference in power used from the near-field and interpret these changes as a message from the receiver. It is noted that other forms of modulation of the transmit power and the load behavior may be utilized.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

It is noted that the exemplary embodiments described herein may be implemented within any suitable wireless power applications, such as wireless charging of mobile devices (e.g., mobile telephones, media players, etc.) or electric vehicles.

As will be appreciated by a person having ordinary skill in the art, it may be advantageous to detect when a device is positioned within a charging region of a wireless power transmitter. Further, it may be advantageous to be able to determine whether or not the detected device is a valid chargeable device.

Figure 6A:
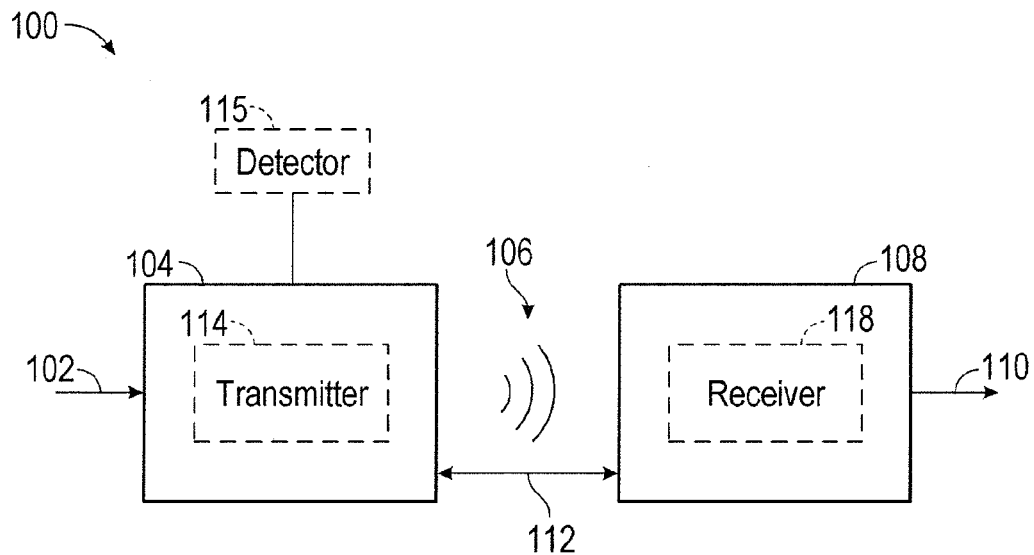
FIG. 6A shows a simplified block diagram of a wireless power transfer system.

Exemplary embodiments, as described herein, relate to detection of chargeable devices positioned within a charging region of a wireless power transmitter while conserving energy in the wireless power transmitter. According to one exemplary embodiment, a wireless power transmitter may enter a low-power mode during a period in which the wireless power transmitter is not transmitting power (e.g., a time period in which a charging region of the wireless power transmitter does not include any receivers). While in the low-power mode, a detection circuit may monitor charging region of the wireless power transmitter to determine if a chargeable device enters the region. The detection circuit may be configured to detect a change in a parameter at the detection circuit. If the detection circuit does not detect a change in a parameter at the detection circuit, the wireless power transmitter may enter a lower power level, sleep mode or possibly turn off, after an amount of time. FIG. 6A is a diagram of the wireless transmission or charging system 100 of FIG. 1, with the addition of a detection circuit 115 connected to the transmitter 104.

Further, if the detection circuit 115 does detect a change in at least one parameter at the detection circuit 115, a potential charging device may be present within a charging region of the wireless power transmitter and, therefore, the wireless power transmitter may attempt to determine whether the device is capable of receiving power from the device (e.g., compatible). For example, the wireless power transmitter may attempt to establish a communication link with the potential device. In some embodiments, the wireless power transmitter may enter a higher power level, or a charging power level, and attempt to charge the potential device. If a communication link is established, the presence of a chargeable device may be verified. If the wireless power transmitter is unable to establish a communication link, the presence of a chargeable device is not verified. In another embodiment, if the detection circuit 115 detects a change in at least one parameter of the detection circuit, a potential charging device may be present within a charging region of the wireless power transmitter and, therefore, the wireless power transmitter may enter into a recurring low power beacon sequence. In one aspect, the low power beacon sequence may detect changes in impedance caused by the potential charging device. In an aspect, the detection circuit 115 is configured to detect a potential chargeable device while consuming less power than required for certain low power beacon sequences. For example, in some implementations a periodic power beacon may have to be sufficiently strong to detect impedance change above a threshold or allow for a chargeable device to draw enough power to communicate back to the transmitter. In accordance with certain embodiments described herein, the detection circuit 115 may be configured to detect a potential chargeable device using less power than certain periodic power beacons. As described above, in response to a potential detection by the detection circuit 115, a transmitter may be configured to either establish a communication link without any further power beacons (e.g., as a replacement for a low power beacon) or to initiate power beacons while attempting to establish a communication link (e.g., power beacons may be desirable in certain embodiments where a receiver with a dead or low battery may need power wirelessly from the beacons to establish the communication link).

In some embodiments, the detection circuit 115 may utilize an oscillator method for detection which may comprise an oscillator running at a frequency determined by the inductance of an inductor combined with a capacitance of the detection circuit 115 or the inductance of a transmit antenna 204 combined with another capacitance. This capacitance can be the capacitance of a transmitter 200 capacitor, the parasitic capacitance of the transmit antenna 204 itself or a separate capacitance within the oscillator. The combination of the inductance and capacitance will result in a resonant frequency. If this resulting circuit is part of a resonant circuit (specifically as part of the feedback circuit that provides over-unity gain) then the oscillator will tend to run at a frequency determined by the inductance and capacitance. Since the inductance will vary based on whether any metal objects are near the charging region of the wireless power transmitter (i.e. transmit antenna 204), the resulting frequency will change as objects are added or removed. This change in frequency can be used to detect object addition or removal.

In certain aspects, a wireless power system may use a detection circuit 115, as described above, to detect a change in a parameter (i.e. frequency), and then will use a secondary method (like an attempt to start charging) to determine whether or not there is a "real" or "chargeable" wireless power device. In some cases an attempt to start charging will result in "false alarms" where the wireless power system attempts to charge, fails to charge since no valid device is present then shuts down again quickly. Since such events may happen infrequently in most applications they may not significantly add to the total power used of the system.

Figure 6B:
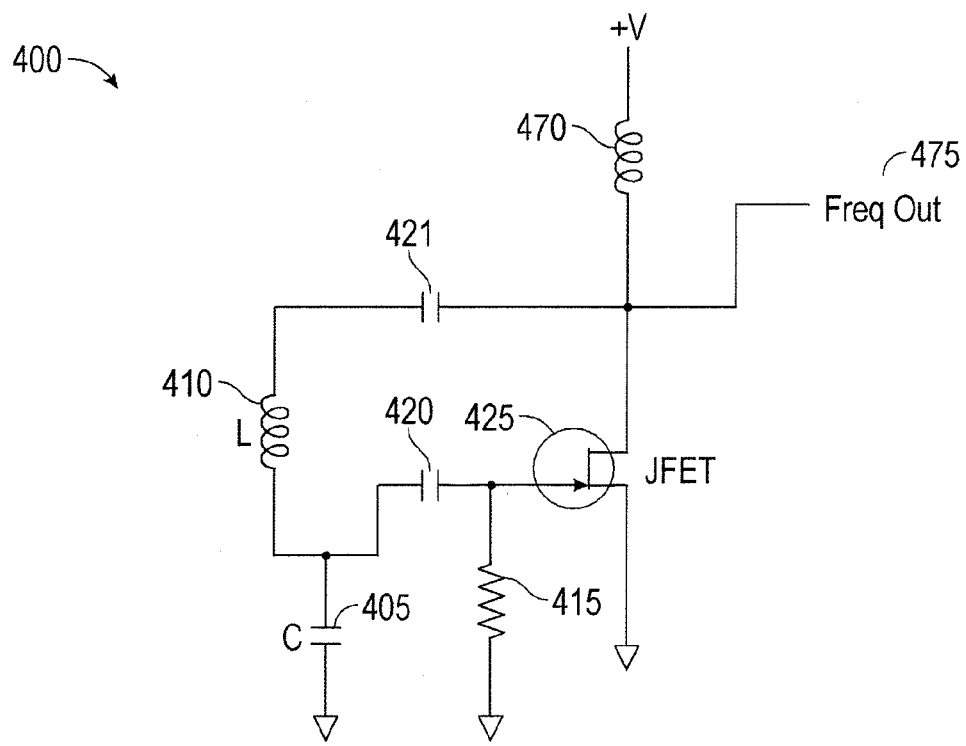
FIG. 6B is a diagram illustrating an exemplary grid dip oscillator.

Several different oscillator circuits can be used in various embodiments. FIG. 6B is a diagram of an exemplary grid dip oscillator that may be used in a detection circuit 115. A grid dip oscillator 400 is an oscillator used to measure a resonant frequency of an attached LC circuit, in accordance with an embodiment. As shown, capacitor 405 and inductor 410 are the components under measurement for an exemplary detection circuit 115. When a metal or chargeable device is brought near the transmitter 104 or 204, the grid dip oscillator 400 may detect a change in the frequency out 475 of the resonant circuit comprising the capacitor 405 and the inductor 410 and detect a potential object in response to the change.

Figure 6C:
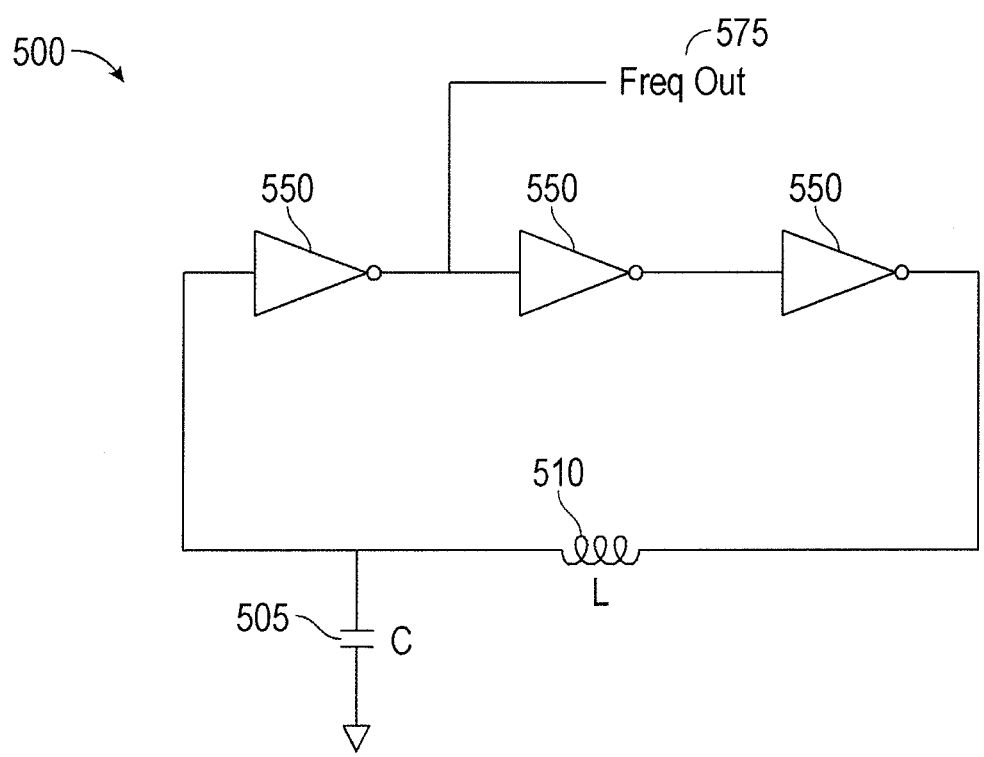
FIG. 6C is a diagram illustrating an exemplary ring oscillator.

FIG. 6C is a diagram of an exemplary ring oscillator that may be used in a detection circuit 115. A ring oscillator 500—an odd numbered string of inverters 550—may be used for crystal oscillators due to its simplicity. As shown, capacitor 505 and inductor 510 are the components under measurement for an exemplary detection circuit 115. Simple single-transistor oscillators such as Colpitts and Hartley oscillators (not shown) may be used as well. Other types of oscillators that have a gain greater than one and that have a feedback which tends to make the circuit unstable may also be used. There may be a sensitive node within the detection circuit 115 (for example the gate drive of a JFET 425 or the base of a bipolar transistor) where the resonant circuit (i.e. the transmit antenna 204 and an additional capacitor) will be connected. The increase or decrease of impedance at the resonant frequency may tend to keep the oscillator at that frequency.

Figure 7A:
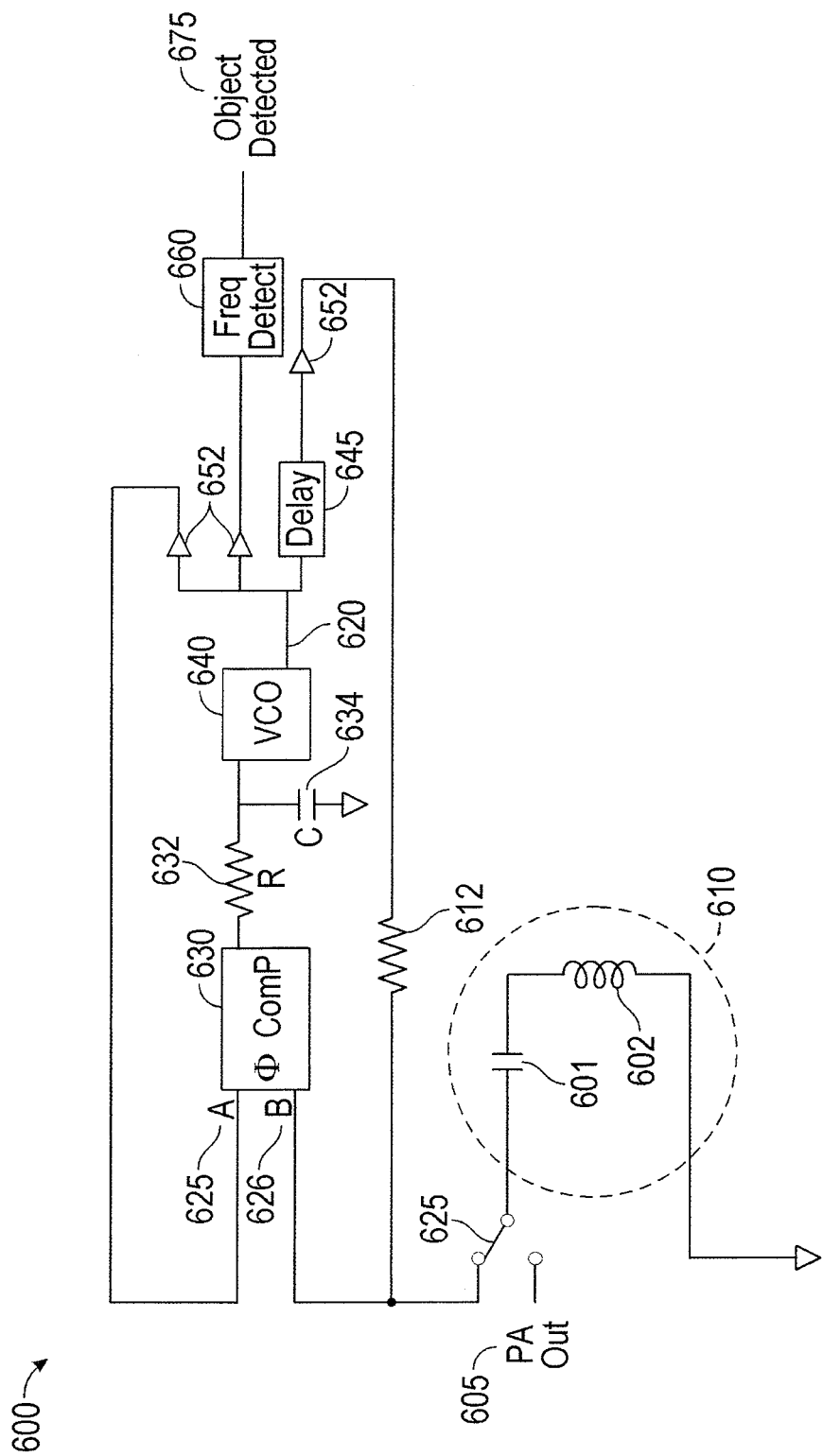
FIG. 7A is a diagram illustrating an exemplary phase locked loop.

In another embodiment, the detection circuit 115 may utilize a phase locked loop (PLL) frequency method which may comprise a PLL. FIG. 7A is a diagram of an exemplary PLL 600 circuit. In this embodiment, the detection circuit 115 uses the PLL 600 to "seek" the resonant frequency of a resonant circuit 610. The PLL 600 has its frequency output 620 connected to one phase comparator input 625 and the resonant circuit 610, driven by the same frequency output, connected to the other phase input 626. Depending on the configuration of the PLL 600 circuit, one frequency output may pass through a delay 645 of 0, 90 or 180 degrees. In most cases a delay of 90 degrees may allow the resonant circuit 610 resonant frequency to be "locked" by the PLL 600 circuit, since at resonance, the PLL 600 circuit may cause a phase delay of 90 degrees from the driving current.

The PLL 600 circuit thus effectively determines the resonant frequency of the resonant circuit 610. A PLL frequency method may be similar to the oscillator method described above, but may have an advantage in that a voltage controlled oscillator (VCO) 640 inside the PLL 600 circuit can be designed so it can only swing between a narrow range of frequencies. For example, if a resonant frequency of 6.78 MHz is expected, the range can be limited to between 6.5 and 7 MHz. This may be advantageous for electro-magnetic interference (EMI) reasons. The PLL frequency method may also have the benefit of being a sensitive detector because frequency may easily be measured and when used with a sensitive phase comparator, the total power used may be low.

Figure 7B:
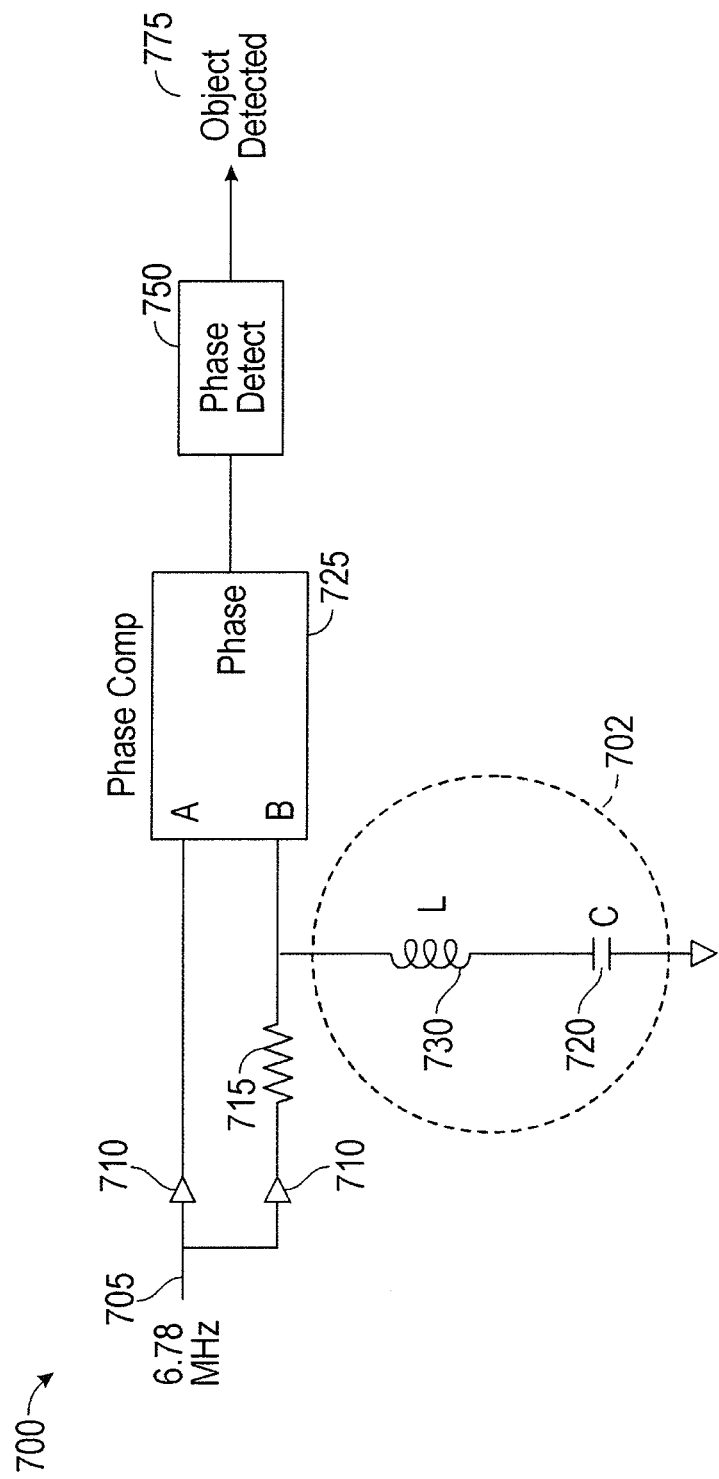
FIG. 7B is a diagram illustrating an exemplary phase comparison method.

In another embodiment, the detection circuit 115 may utilize a fixed frequency phase comparator method. FIG. 7B is a diagram of a circuit 700 utilizing the phase comparator method. The circuit 700 may comprise a phase comparator 725 that measures the phase delay caused by a LC circuit 702 against a reference clock 705. As the inductance changes, the phase lag changes. One advantage of the phase comparator method is that it can operate at a fixed frequency (6.78 MHz as shown), which helps the detection circuit 115 meet EMI limits. However, the phase comparator method may be less sensitive than a frequency based solution since the resulting voltage change at the output of the phase detector may be small.

Figure 8:
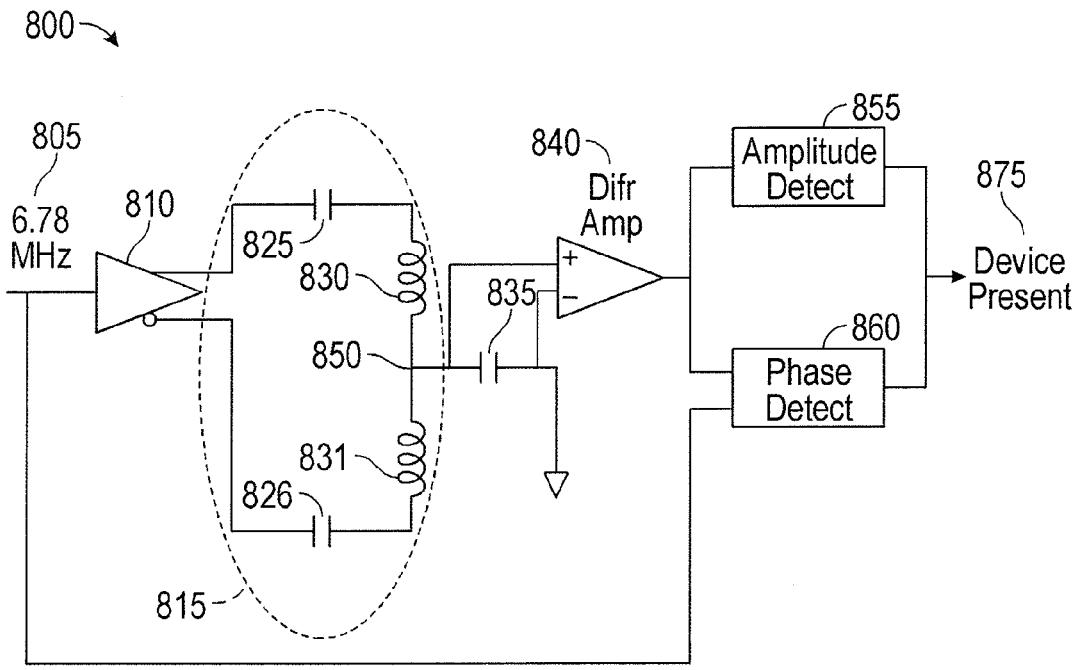
FIG. 8 is a diagram illustrating an exemplary differential center tap imbalance sensing method.

In another embodiment, the detection circuit 115 may utilize a differential center tap imbalance sensing method. FIG. 8 is a diagram of a center tap imbalance method circuit 800. In a center tap imbalance method circuit 800, when a transmit antenna 204 is driven by a power amplifier 210, a perfectly balanced load will result in zero voltage/current at a center tap point 850. Any imbalance due to off center placement, i.e. nearby metal objects, etc., will result in a measurable current/voltage at the center tap point 850. Thus, a method of implementing a detection circuit 115 is to monitor the center tap point 850 and detect any change in current or voltage, in accordance with an embodiment.

As shown in FIG. 8, a differential amplifier 840 across a center tap capacitor 835 can be used to detect current. If the user adds, removes or changes the placement of a device, the balance between the two halves of the resonator circuit 815 will change, a current change will be seen, and the object will be detected. The circuit 800 also comprises an amplitude detector 855 and a phase detector 860 connected to the output of the differential amplifier 840. Note that a differential antenna with a center tap ground or neutral point is electrically similar to a single ended resonator, but may have some advantages when it comes to EMI generation.

Note that as in many other methods mentioned here, in response to a detection of an object, the system may power up and attempt to charge the device using some other means. Thus, while this may result in "false alarms" when the object isn't a compatible chargeable device, it will likely not result in unexpected behavior to the user, since the transmitter 200 will not power on permanently until a new, chargeable device is actually detected. Since the false alarms may cause power-ups for a small fraction of the total use time, the additional power used may be, on average, negligible.

In some embodiments, it may be difficult to efficiently generate a small signal from a power amplifier 210 for detection purposes. A high power amplifier may not be able to operate at a low power very efficiently, and if a lower power amplifier is coupled in via a switch or a transformer, it may add complexity or parasitic loads.

Figure 9:
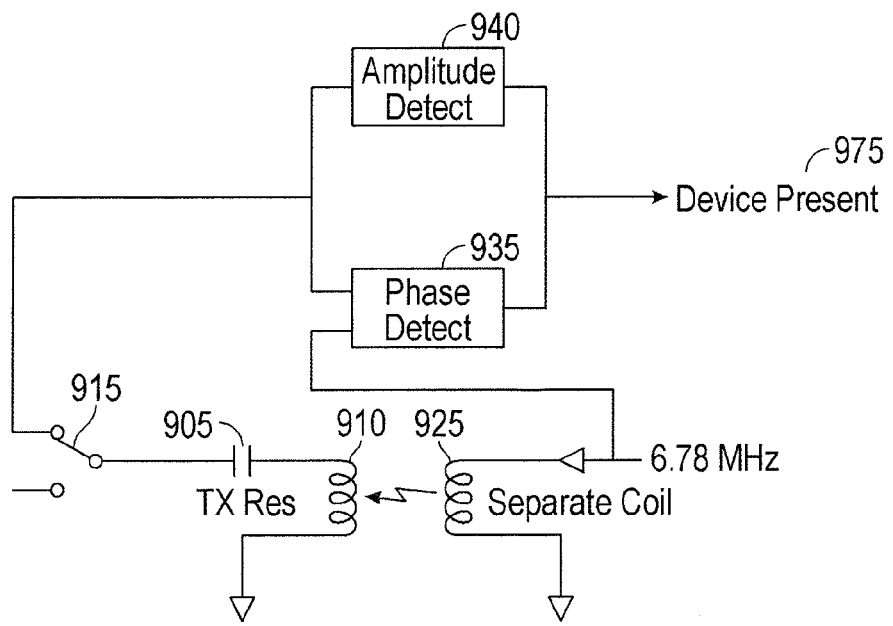
FIG. 9 is a diagram illustrating an exemplary separate coil excitation configuration.

To avoid this problem, in accordance with another aspect, a transmit antenna 204 may be excited via a separate detector excitation coil. FIG. 9 is a diagram of an exemplary separate coil configuration. The separate coil 925 may be inactive during normal charging and may be used only to provide a low power field for detection. Enough power may be coupled to a transmitter (TX) coil 910 to allow detection.

The separate coil 925 may be a small coil in the center of the TX coil 910, a small coil near the edge of the TX coil 910 or even a coil that encircles the TX coil 910. A wireless power system may then detect an object being placed via different methods—in one aspect by detecting a change in the amplitude or phase of the TX coil 910 caused by an object placed or, in another aspect, via detecting a change in coupling between the separate coil 925 and the primary TX coil 910 caused by the object. The separate coil configuration may be applied to any of the detection circuits or methods described herein.

Figure 10A:
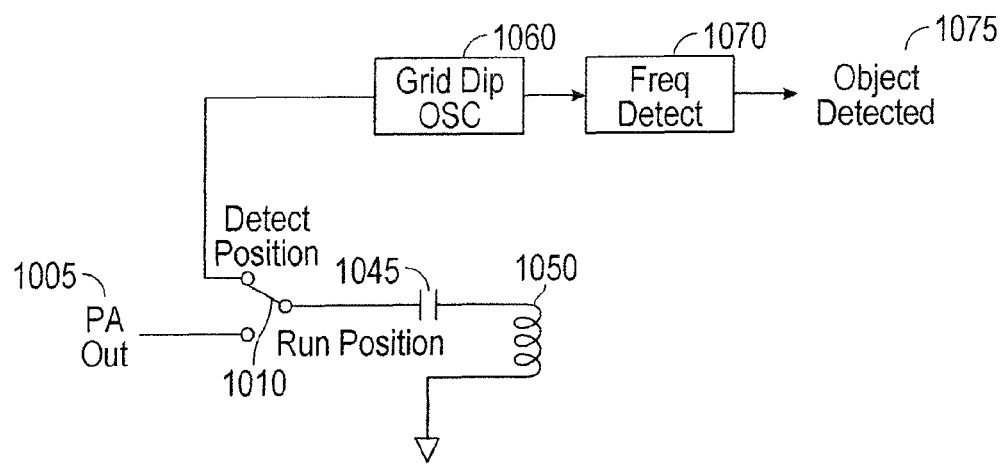
FIG. 10A is a diagram illustrating an exemplary switch configuration with a detection circuit and a transmitter.

In some aspects, the detection circuit 115 may be connected to a switch that selectively electronically isolates the transmit resonator from the detection circuit 115. FIG. 10A is a diagram illustrating a detection circuit 115 (grid dip oscillator 1030) connected to a switch 1010 that isolates the transmit antenna 1050 from the detection circuit 115. This configuration may be useful in some cases where a protection switch (i.e. switch 1010) isolates the detection circuit 115 from the transmit antenna 1050 to protect the detection circuit 115 from strong magnetic fields during wireless power transfer. Thus, the detection circuit 115 may only be connected when the switch is in the "detect" state (as shown in FIG. 10A). This configuration may have the advantage that the detection circuit 115 may be exposed to lower voltages and that the additional conductance and inductance of a power amplifier 210 may be removed. FIGS. 7A and 9 also show a switch connection. In addition, the isolation may be advantageous for ensuring the detection circuit does not interfere with the main resonator during normal operation (e.g., during a mode for wirelessly transferring power to a device).

Figure 10B:
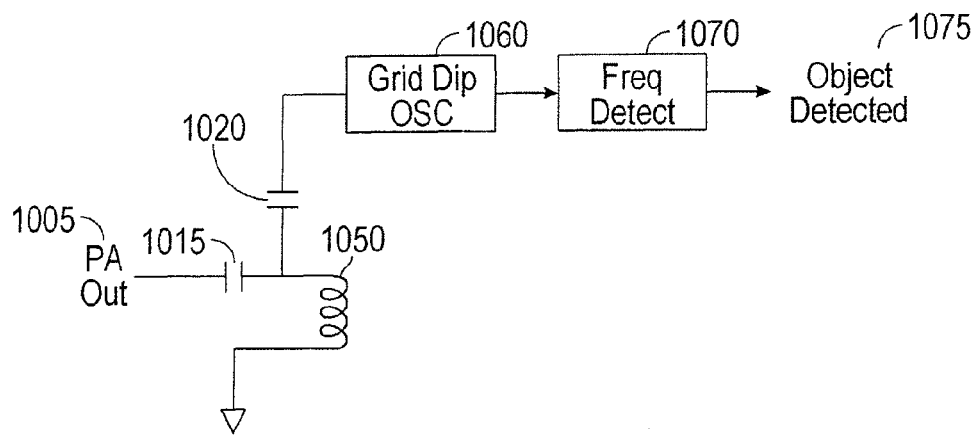
FIG. 10B is a diagram illustrating an exemplary direct connection configuration with a detection circuit and a transmitter.

In some cases the detection circuit 115 may be connected directly to a transmit antenna 204 with no means of disconnection from the rest of the transmitter 200, including a power amplifier 210. FIG. 10B is a diagram illustrating a detection circuit 115 (grid dip oscillator 1030) connected directly to the transmit antenna 1050 with no means of disconnection. It may be possible that the detection circuit 115 may operate only when the transmitter 200 is off, but it may still be physically connected. This configuration may have the advantage of being simple and cheap and would not require switching. However, the detection circuit 115 may be exposed to high voltages during operation, the detection circuit 115 may interfere with normal operation of the transmitter 200, and the detection circuit 115 may receive the parasitic inductance and capacitance of the transmitter 200 even when it is off.

Figure 10C:
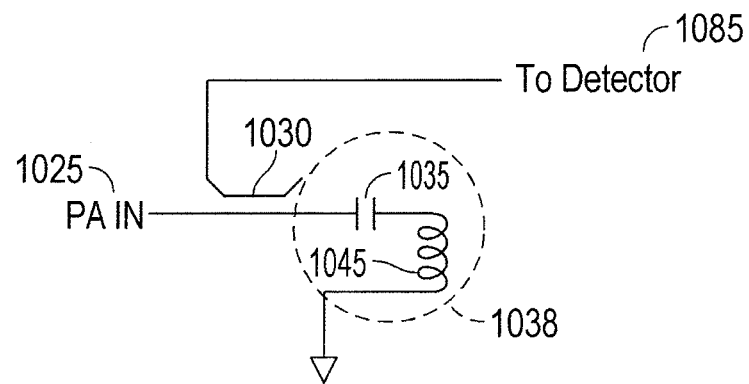
FIG. 10C is a diagram illustrating an exemplary directional coupler configuration with a transmitter.

In some embodiments, other isolation methods may be used to selectively electronically isolate a transmitter 200 from a detection circuit 115. FIG. 10C is a diagram of an exemplary directional coupler 1030 configured with a transmit circuit 1038. A directional coupler 1030 may be used to couple power from one direction of a transmission line. In this case, shown in FIG. 10C, the coupler 1030 detects reflected power from the transmit circuit 1038. Reflected power may change more than power measured directly, since a perfect impedance match would yield no reflection at all.

Figure 10D:
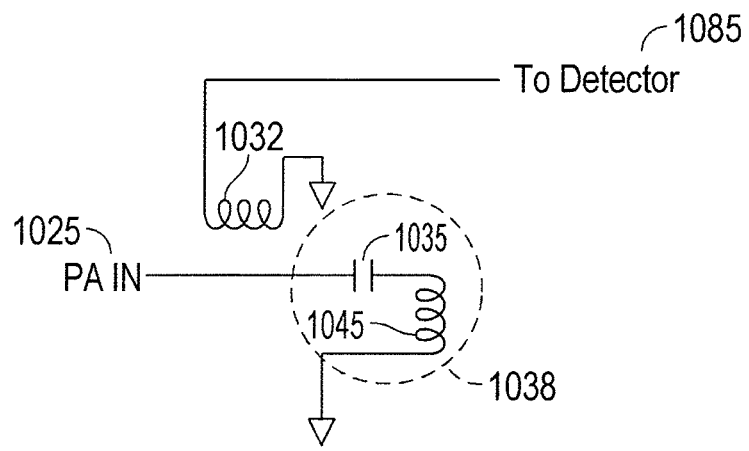
FIG. 10D is a diagram illustrating an exemplary transformer configuration with a transmitter.

In another embodiment, a transformer may be used to isolate the detection circuit 115. FIG. 10D is a diagram of a transformer 1032 configured with a transmit circuit 1038. The transformer 1032 allows galvanic separation from the power amplifier 1025 and may allow a higher degree of isolation than a capacitor coupler.

Figure 10E:
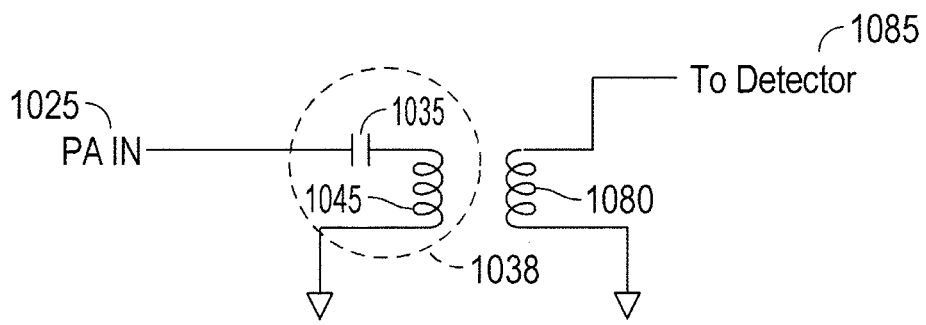
FIG. 10E is a diagram illustrating an exemplary separate coupling coil configuration with a transmitter.

In another embodiment, a separate coupling coil may be used to isolate the detection circuit 115. FIG. 10E is a diagram of a separate coupling coil 1080 configured with a transmit circuit 1038. The separate coupling coil 1080 may be a similar configuration to a transformer configuration (FIG. 10D), but couples to the entire transmit antenna 1045 rather than only the input 1025. The switch and isolation configurations described above and illustrated in FIGS. 10A-E may be applied to any detection circuit 115 or detection method described herein.

With reference again to FIG. 4, as previously noted, load sensing circuit 216 may be configured to for adjusting a power mode of transmitter 200. More specifically, controller 214 may be configured to reduce a power level, or possibly turn off the power, of transmitter 200.

According to one exemplary embodiment, a detection circuit 115 may be configured to detect a presence of a device within an associated charging region while in a low-power mode. More specifically, transmitter 202, via controller 214, may be configured to transition to a low-power mode while an associated charging region lacks any detectable devices and the transmitter is not transmitting power. Furthermore, the detection circuit 115 may be configured to detect a change in a parameter (e.g., frequency, phase, voltage, current, etc.) of the detection circuit 115.

If the detection circuit 115 does not detect a change in a parameter or the change in the parameter is within a certain threshold, the transmitter 200 may further decrease an associated power level, or the power of transmitter 200 may be turned off entirely.

If the detection circuit 115 detects a change in a parameter or the change in the parameter is above a certain threshold, (i.e., the frequency in a detection circuit 115 using the oscillator method has changed), transmitter 200 may be configured to determine whether an associated charging region includes a chargeable device. By way of example, transmitter 200 (i.e., controller 214) may attempt to establish a communication link with the detected device to determine whether an associated charging region includes a valid chargeable device.

If transmitter 200 determines that a valid chargeable device exists within the charging region (e.g., transmitter 200 successfully establishes a communication link with a chargeable device), transmitter 200 may transmit power thereto. If transmitter 200 determines that a valid chargeable device does not exist within the charging region (e.g., transmitter 200 is unable to establish a communication link with a chargeable device), transmitter 200 may be configured to return to a low power mode or reduce its current power level.

Figure 11:
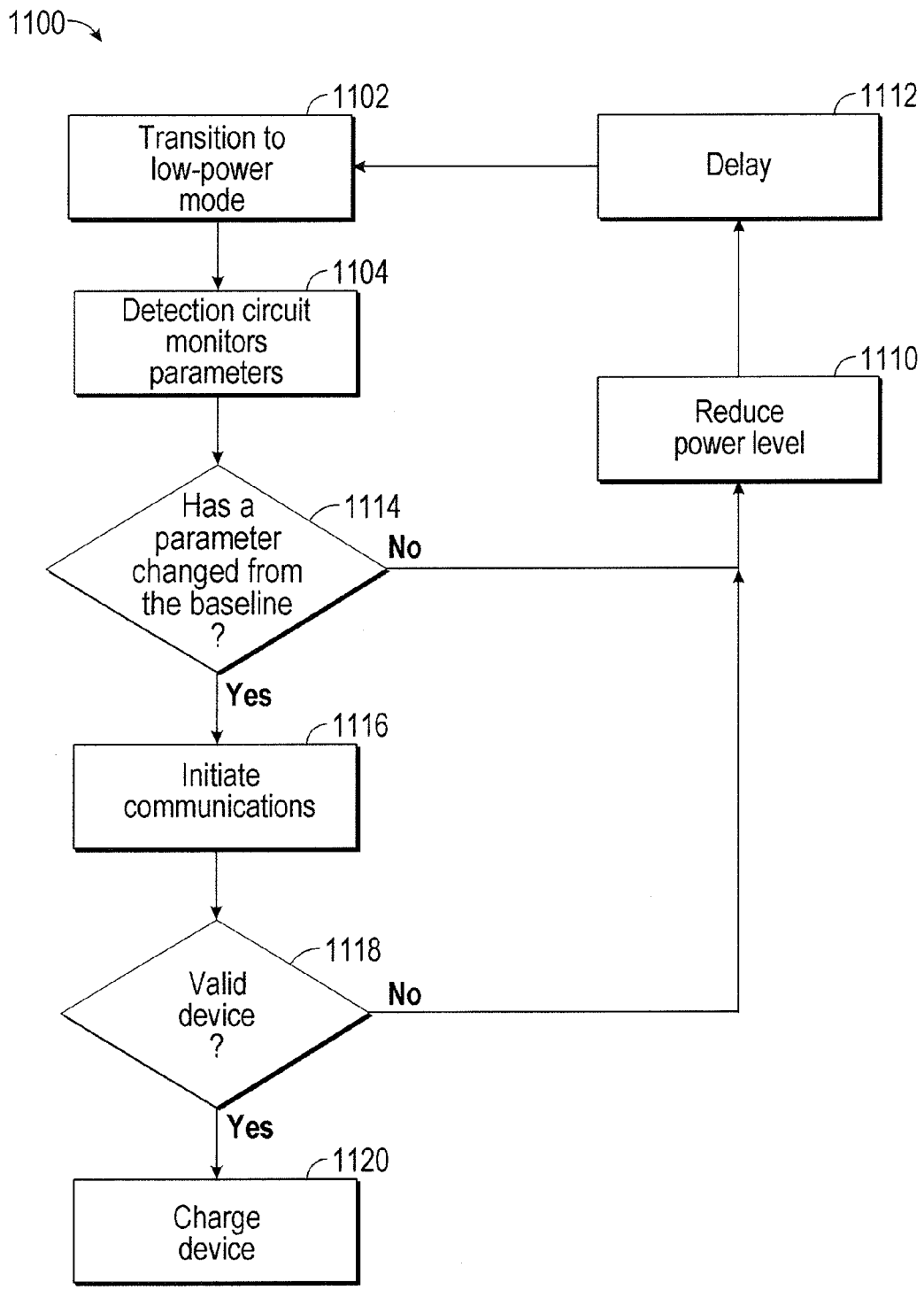
FIG. 11 is a flowchart illustrating a method, according to certain exemplary embodiments described herein.

FIG. 11 illustrates a flowchart illustrating a method 1100, in accordance with an exemplary embodiment of the present invention. Method 1100 may include causing a transmitter (e.g., transmitter 202 of FIG. 4) to enter a low-power mode (depicted by numeral 1102). The transmitter may enter a low-power mode while an associated charging region lacks any potential chargeable devices and the transmitter is not transmitting power. Furthermore, method 1100 may include the detection circuit 115 monitoring one or more parameters (depicted by numeral 1104) and determining whether a parameter has changed from a baseline (depicted by numeral 1114).

If the detection circuit 115 has not detected a change in a parameter indicating an object within a charging region, method 1100 may proceed back to step 1110, where the power of the transmitter may be further decreased, or turned off entirely. After a short delay (depicted by numeral 1112), method 1100 may include causing a transmitter to enter the low-power mode (depicted by numeral 1102).

If the detection circuit 115 does detect a change in a parameter, a charging device may potentially be positioned within a charging region of the transmitter and the transmitter may determine whether an associated charging region includes a valid chargeable device (depicted by numeral 1116). By way of example, the transmitter may determine whether an associated charging region includes a valid chargeable device by attempting to initiate a communication link with a device positioned within a near-field of the transmitter or attempting to charge the device within the near-field.

If the transmitter determines that a valid chargeable device exists (depicted by numeral 1118) within the charging region (e.g., the transmitter successfully establishes a communication link with a chargeable device) the transmitter may transmit power thereto (depicted by numeral 1120). If the transmitter determines that a valid chargeable device does not exist within the charging region (e.g., the transmitter is unable to establish a communication link with a chargeable device), method 1100 may revert back to step 1110, where the power of the transmitter may be further decreased, or turned off entirely.

In comparison to conventional methods and devices, exemplary embodiments of the present invention may require less power to detect and validate chargeable devices positioned within a charging region of a wireless power transmitter. Furthermore, devices may be validated as wireless chargeable devices prior to transmitting power within the charging region.

Figure 12:
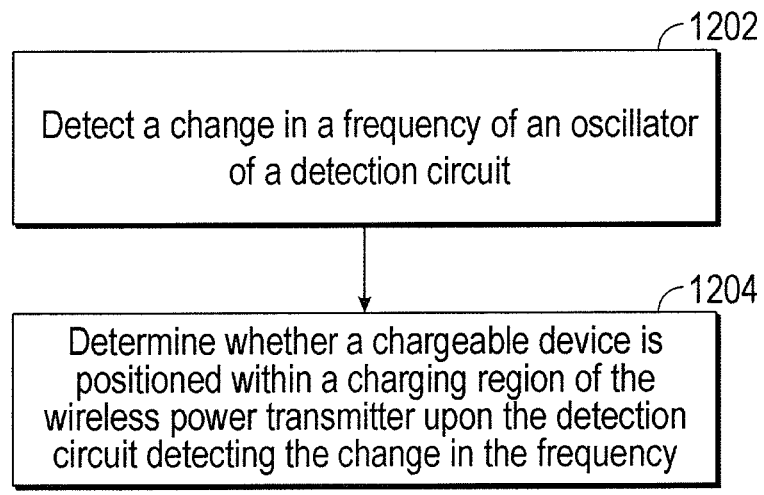
FIG. 12 is a flowchart illustrating a method, according to certain exemplary embodiments described herein.

FIG. 12 is a flowchart illustrating a method 1200, in accordance with one or more exemplary embodiments. Method 1200 may include detecting a change in a frequency of an oscillator of a detection circuit (depicted by numeral 1202). Further, method 1200 may include determining whether a chargeable device is positioned within a charging region of the wireless power transmitter upon the detection circuit 115 detecting the change in the frequency (depicted by numeral 1204).

Figure 13:
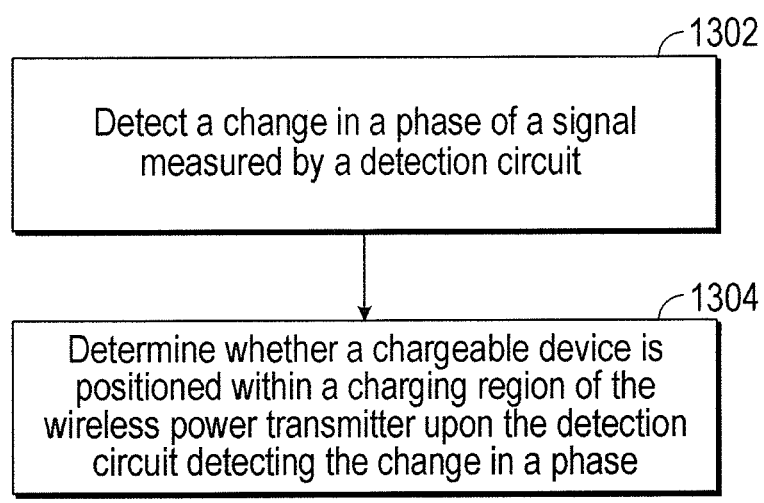
FIG. 13 is a flowchart illustrating a method, according to certain exemplary embodiments described herein.

FIG. 13 is a flowchart illustrating another method 1300, in accordance with one or more exemplary embodiments. Method 1300 may include detecting a change in a phase of a signal measured by of a detection circuit 115 (depicted by numeral 1302). Method 1300 may further include determining whether a chargeable device is positioned within a charging region of the wireless power transmitter upon the detection circuit 115 detecting the change in a phase (depicted by numeral 1304).

Figure 14:
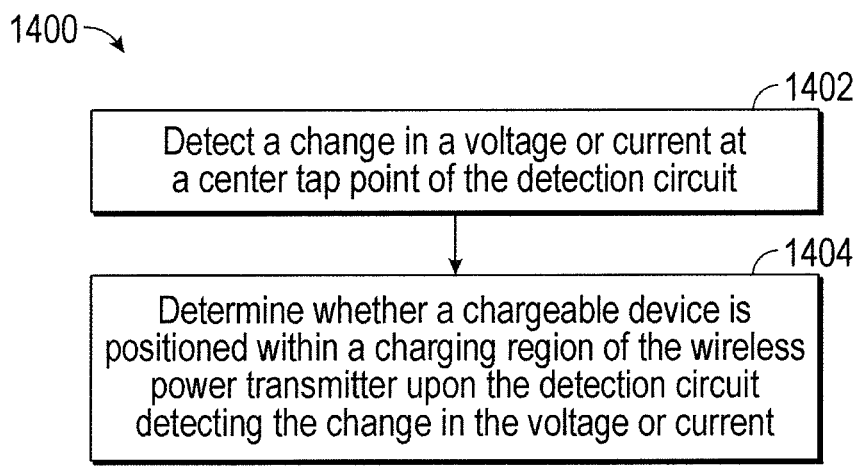
FIG. 14 is a flowchart illustrating a method, according to certain exemplary embodiments described herein.

FIG. 14 is a flowchart illustrating another method 1400, in accordance with one or more exemplary embodiments. Method 1400 may include detecting a change in a voltage or current at a center tap point of the transmit antenna 114 (depicted by numeral 1402). Method 1400 may further include determining whether a chargeable device is positioned within a charging region of the wireless power transmitter upon the detection circuit 115 detecting the change in the voltage or current (depicted by numeral 1404).

Figure 15:
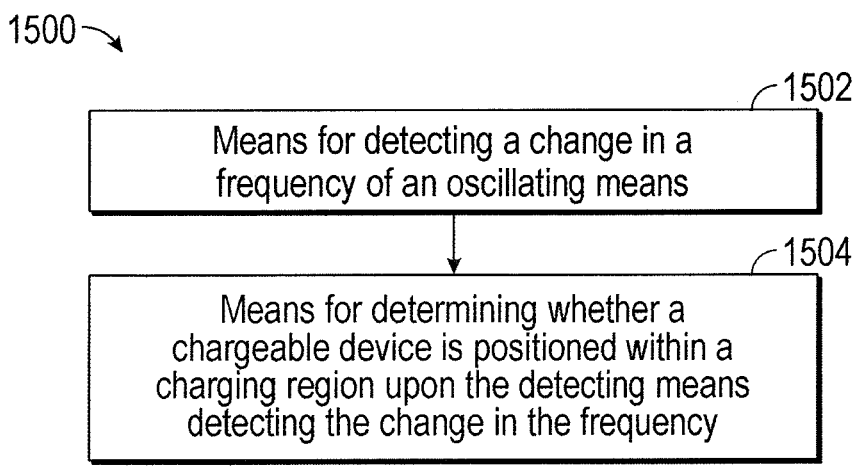
FIG. 15 is a functional block diagram of an apparatus for providing wireless power, in accordance with certain embodiments described herein.

FIG. 15 is a functional block diagram of a device 1500, in accordance with one or more exemplary embodiments. Those skilled in the art will appreciate that the device 1500 may have more components than the simplified block diagrams shown in FIG. 15. FIG. 15 includes only those components useful for describing some prominent features of implementations within the scope of the claims.

Device 1500 comprises means 1502 for detecting a change in a frequency of an oscillator. In certain embodiments, the means 1502 for detecting can be implemented by the grid dip oscillator 400 (FIG. 6B) or by the ring oscillator 500 (FIG. 6C). Device 1500 may further comprise means 1504 for determining whether a chargeable device is positioned within a charging region upon the detecting means detecting the change in the frequency. In certain embodiments, the means 1504 for determining comprises the transmitter 104 or 202 (FIGS. 1, 2, 4).

Figure 16:
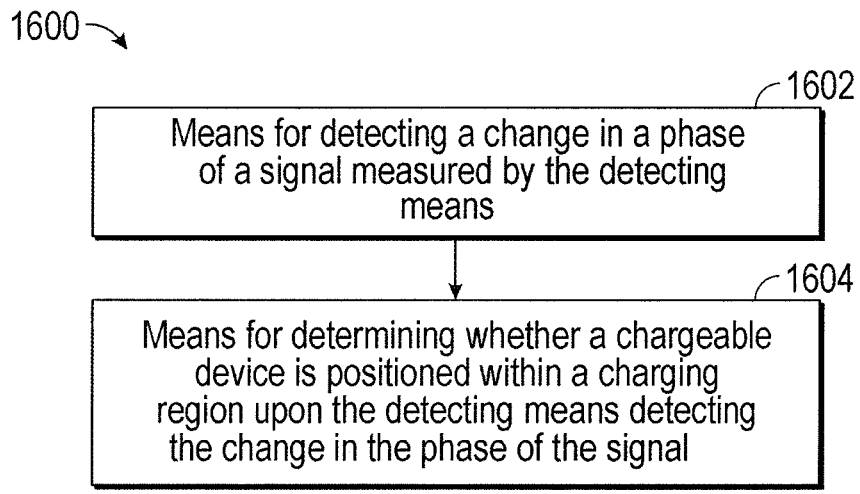
FIG. 16 is a functional block diagram of an apparatus for providing wireless power, in accordance with certain embodiments described herein.

FIG. 16 is a functional block diagram of a device 1600, in accordance with one or more exemplary embodiments. Those skilled in the art will appreciate that the device 1600 may have more components than the simplified block diagrams shown in FIG. 16. FIG. 16 includes only those components useful for describing some prominent features of implementations within the scope of the claims.

Device 1600 comprises means 1602 for detecting a change in a phase of a signal.

In certain embodiments, the means 1602 for detecting can be implemented by the PLL 600 circuit (FIG. 7A) or by the circuit 700 (FIG. 7B). Device 1600 may further comprise means 1604 for determining whether a chargeable device is positioned within a charging region upon the detecting means detecting the change in the phase of the signal. In certain embodiments, the means 1604 for determining comprises the transmitter 104 or 202 (FIGS. 1, 2, 4).

Figure 17:
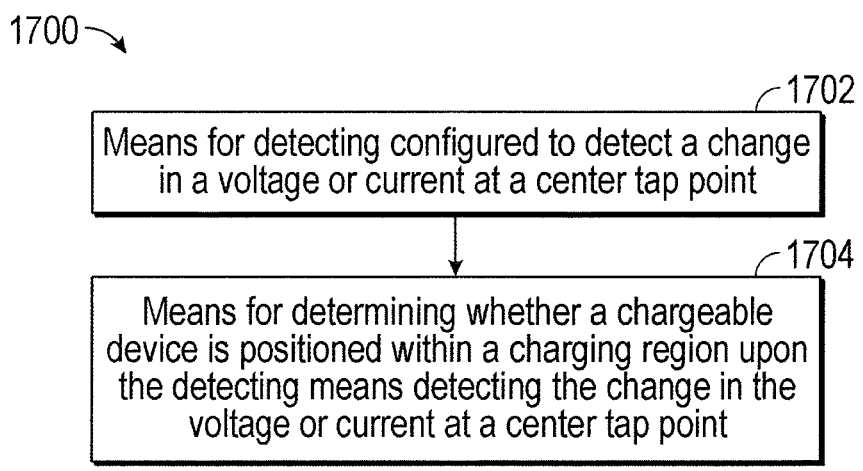
FIG. 17 is a functional block diagram of an apparatus for providing wireless power, in accordance with certain embodiments described herein.

FIG. 17 is a functional block diagram of a device 1700, in accordance with one or more exemplary embodiments. Those skilled in the art will appreciate that the device 1700 may have more components than the simplified block diagrams shown in FIG. 17. FIG. 17 includes only those components useful for describing some prominent features of implementations within the scope of the claims.

Device 1700 comprises means 1702 for detecting a change in a voltage or current at a center tap point. In certain embodiments, the means 1702 for detecting can be implemented by center tap imbalance method circuit 800 (FIG. 8). Device 1700 may further comprise means 1704 for determining whether a chargeable device is positioned within a charging region upon the detecting means detecting the change in the current or voltage. In certain embodiments, the means 1704 for determining comprises the transmitter 104 or 202 (FIGS. 1, 2, 4).

One aspect of this disclosure provides a method for providing wireless power. In one aspect, the method includes: detecting a change in a phase of a signal measured by a detection circuit, wherein the detection circuit comprises a phase locked loop or a reference clock and a phase comparator. In some aspects, the method further includes determining whether a chargeable device is positioned within a charging region of a wireless power transmitter upon detecting the change in the phase of a signal. In some aspects, the detection circuit is selectively operational based on an operational characteristic of the transmitter. In some aspects, determining whether a chargeable device is positioned within a charging region comprises attempting to establish a communication link with a device, or attempting to charge a device, to determine whether a chargeable device is present within an associated charging region. In some aspects, the method also includes transitioning from a first power state to a second power state based on detecting the change in the phase of a signal, the first power state having a lower power output from the transmitter than the second power state. In some aspects, the method also includes transmitting a periodic signal in response to detecting the change in the phase of the signal. In some aspects, the change in the phase of the signal is a result of a change in a phase of a resonant circuit, the resonant circuit comprising a transmit resonator of the transmitter.

Another aspect of this disclosure provides a method for providing wireless power. In one aspect, the method includes: detecting a change in a voltage or current at a center tap point of a detection circuit, the detection circuit comprising a differential antenna. In some aspects, the method also includes determining whether a chargeable device is positioned within a charging region of the transmitter upon detecting the change in the voltage or current. In some aspects, the detection circuit is selectively operational based on an operational characteristic of the transmitter. In some aspects, the method also includes determining whether a chargeable device is positioned within a charging region comprises attempting to establish a communication link with a device, or attempting to charge a device, to determine whether a chargeable device is present within an associated charging region. In some aspects, the method further includes transitioning from a first power state to a second power state based on detecting the change in the voltage or current, the first power state having a lower power output from the transmitter than the second power state. In some aspects, the method also includes transmitting a periodic signal in response to detecting the change in the voltage or current.

Another aspect of this disclosure provides a device for providing wireless power. In one aspect, the device includes: means for detecting comprising an oscillating means, the detecting means configured to detect a change in a frequency of the oscillating means; and means for determining whether a chargeable device is positioned within a charging region of a means for transmitting wireless power upon the detecting means detecting the change in the frequency, wherein the transmitting means further configured to be selectively electrically isolated from the detecting means. In some aspects, the detecting means comprises a means for exciting the transmitting means. In some aspects, the detecting means is selectively operational based on an operational characteristic of the transmitting means. Some aspects of the apparatus also include means for determining whether a chargeable device is present within an associated charging region, the determining means configured to attempt to establish a communication link with a device, or attempt to charge a device. In some aspects, the means for transmitting further configured to operate in one of at least a first and second power state, the first power state having a lower power output from the transmitting means than the second power state, wherein the transmitting means is further configured to transition from the first power state to the second power state based on detecting the change in the frequency of the oscillating means. In some aspects, the means for transmitting further configured to transmit a periodic signal in response to detecting the change in the frequency of the oscillating means. In some aspects, the change in frequency of the oscillating means is a result of a change in a resonant frequency of a resonant circuit, the resonant circuit comprising a resonating means of the transmitting means.

Another aspect of this disclosure provides a device for providing wireless power. In one aspect, the device includes: means for detecting configured to detect a change in a phase of a signal; and means for determining whether a chargeable device is positioned within a charging region of a means for transmitting wireless power upon the detecting means detecting the change in the phase. In some aspects, the transmitting means further configured to be selectively electrically isolated from the detecting means. In some aspects, the detecting means comprises a means for exciting the transmitting means. In some aspects, the detecting means is selectively operational based on an operational characteristic of the transmitting means. Some aspects of the apparatus also include means for determining whether a chargeable device is present within an associated charging region, the determining means configured to attempt to establish a communication link with a device, or attempt to charge a device. In some aspects, the means for transmitting further configured to operate in one of at least a first and second power state, the first power state having a lower power output from the transmitting means than the second power state, wherein the transmitting means is further configured to transition from the first power state to the second power state based on detecting the change in the phase of the signal. In some aspects, the means for transmitting further configured to transmit a periodic signal in response to detecting the change in the phase of the signal. In some aspects, the change in the phase of the signal is a result of a change in a resonant frequency of a resonant circuit, the resonant circuit comprising a resonating means of the transmitting means.

Another aspect of this disclosure provides a device for providing wireless power. In one aspect, the device includes:

means for detecting configured to detect a change in a voltage or current of at a center tap point; and means for determining whether a chargeable device is positioned within a charging region of a means for transmitting wireless power upon the detecting means detecting the change in the voltage or current at the center tap point. In some aspects, the transmitting means further configured to be selectively electrically isolated from the detecting means. In some aspects, the detecting means comprises a means for exciting the transmitting means. In some aspects, the detecting means is selectively operational based on an operational characteristic of the transmitting means. Some aspects of the apparatus also include means for determining whether a chargeable device is present within an associated charging region, the determining means configured to attempt to establish a communication link with a device, or attempt to charge a device. In some aspects, the means for transmitting further configured to operate in one of at least a first and second power state, the first power state having a lower power output from the transmitting means than the second power state, wherein the transmitting means is further configured to transition from the first power state to the second power state based on detecting the change in the voltage or current. In some aspects, the means for transmitting further configured to transmit a periodic signal in response to detecting the change in the voltage or current.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device for providing wireless power, comprising:
   a detection circuit comprising an oscillator, the detection circuit configured to detect a change in a frequency of the oscillator; and
   a wireless power transmitter configured to determine whether a chargeable device is positioned within a charging region of the transmitter upon the detection circuit detecting the change in the frequency of the oscillator, wherein the transmitter further configured to be electrically isolated from the detection circuit, wherein the transmitter is further configured to operate in one of at least a first and second power state, the first power state having a lower power output from the transmitter than the second power state, wherein the transmitter is configured to transition from the first power state to the second power state based on detecting the change in the frequency of the oscillator.

2. The device of claim 1, further comprising an isolator configured to couple the detection, circuit to the transmitter, wherein the isolator comprises a switch, directional coupler, transformer, or separate coupling coil.

3. The device of claim 1, wherein the detection circuit comprises a coil coupled to a coil of the transmitter, wherein the detection circuit coil is configured to excite the transmitter coil.

4. The device of claim 1, wherein the detection circuit is selectively operational based on an operational characteristic of the transmitter.

5. The device of claim 1, wherein the transmitter is further configured to attempt to establish a communication link with the chargeable device, or attempt to charge the chargeable device, to determine whether the chargeable device is present within an associated charging region.

6. The device of claim 1, wherein the transmitter is further configured to transmit a periodic signal in response to detecting the change in the frequency of the oscillator.

7. The device of claim 1, wherein the change in frequency of the oscillator is a result of a change in a resonant frequency of a resonant circuit, the resonant circuit comprising a transmit resonator of the transmitter.

8. A device for providing wireless power, comprising:
   a detection circuit configured to detect a change in a phase of a signal measured by the detection circuit; and
   a wireless power transmitter configured to determine whether a chargeable device is positioned within a charging region of the transmitter upon the detection circuit detecting the change in the phase of the signal, wherein the transmitter is further configured to operate in one of at least a first and second power state, the first power state having a lower power output from the transmitter than the second power state, wherein the transmitter is configured to transition from the first power state to the second power state based on detecting the change in the phase of the signal measured by the detection circuit.

9. The device of claim 8, wherein the detection circuit comprises a phase locked loop or a reference clock and a phase comparator.

10. The device of claim 8, wherein the detection circuit is further configured to be selectively electrically isolated from the transmitter by coupling the detection circuit to the transmitter via a switch, directional coupler, transformer, or separate coupling coil.

11. The device of claim 8, wherein the detection circuit comprises a coil coupled to a coil of the transmitter, wherein the detection circuit coil is configured to excite the transmitter coil.

12. The device of claim 8, wherein the detection circuit is selectively operational based on an operational characteristic of the transmitter.

13. The device of claim 8, wherein the transmitter is further configured to attempt to establish a communication link with the chargeable device, or attempt to charge the chargeable device, to determine whether the chargeable device is present within an associated charging region.

14. The device of claim 8, wherein the transmitter is further configured to transmit a periodic signal in response to detecting the change in the phase of the signal.

15. The device of claim 8, wherein the change in phase of the signal is a result of a change in a phase of a resonant circuit, the resonant circuit comprising a transmit resonator of the transmitter.

16. A device for providing wireless power, comprising:
   a detection circuit comprising a differential antenna, the detection circuit configured to detect a change in a voltage or current at a center tap point of the differential antenna; and
   a wireless power transmitter configured to determine whether a chargeable device is positioned within a charging region of the transmitter upon the detection circuit detecting the change in the voltage or current at the center tap point.

17. The device of claim 16, wherein the detection circuit further configured to be selectively electrically isolated from the transmitter via a switch, directional coupler, transformer, or separate coupling coil.

18. The device of claim 16, wherein the detection circuit comprises a coil coupled to a coil of the transmitter, wherein the detection circuit coil is configured to excite the transmitter coil.

19. The device of claim 16, wherein the detection circuit is selectively operational based on an operational characteristic of the transmitter.

20. The device of claim 16, wherein the transmitter is further configured to attempt to establish a communication link with the chargeable device, or attempt to charge the chargeable device, to determine whether the chargeable device is present within an associated charging region.

21. The device of claim 16, wherein the transmitter is further configured to operate in one of at least a first and, second power state, the first power state having a lower power output from the transmitter than the second power state, wherein the transmitter is configured to transition from the first power state to the second power state based on detecting the change in the voltage or current.

22. The device of claim 16, wherein the transmitter is further configured to transmit a periodic signal in response to detecting the change in the voltage or current.

23. A method for providing wireless power, comprising:
   detecting a change in a frequency of an oscillator of a detection circuit;
   determining whether a chargeable device is positioned within a charging region of a wireless power transmitter upon detecting the change in the frequency of the oscillator; and
   transitioning from a first power state to a second power state based on detecting the change in the frequency of the oscillator, the first Rower state having a lower power output from the transmitter than the second power state.

24. The method of claim 23, wherein the detection circuit is selectively operational based on an operational characteristic of the transmitter.

25. The method of claim 23, wherein determining whether the chargeable device is positioned within a charging region further comprises attempting to establish a communication link with the chargeable device or attempting to charge the chargeable device to determine whether the chargeable device is present within an associated charging region in response to detecting the change in the frequency.

26. The method of claim 23, further comprising transmitting a periodic signal in response to detecting the change in the voltage or current.

27. The method of claim 23, wherein the change in the frequency of the oscillator is a result of a change in a frequency of a resonant circuit, the resonant circuit comprising a transmit resonator of the transmitter.

* * * * *